United States Patent
Sivakumar et al.

(10) Patent No.: US 11,733,729 B2
(45) Date of Patent: Aug. 22, 2023

(54) CENTRALIZED IMPOSING OF MULTI-CLOUD CLOCK SPEEDS

(71) Applicant: International Business Machines Corporation, Armonk, NY (US)

(72) Inventors: Gandhi Sivakumar, Bentleigh (AU); Luke Peter Macura, Lucas (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 17/448,900

(22) Filed: Sep. 27, 2021

(65) Prior Publication Data

US 2023/0097310 A1   Mar. 30, 2023

(51) Int. Cl.
*G06F 1/08* (2006.01)
*G06F 11/30* (2006.01)

(52) U.S. Cl.
CPC ............ *G06F 1/08* (2013.01); *G06F 11/3024* (2013.01); *G06F 11/3055* (2013.01)

(58) Field of Classification Search
CPC ..... G06F 1/08; G06F 11/3024; G06F 11/3055
See application file for complete search history.

(56) References Cited

U.S. PATENT DOCUMENTS

| | | | |
|---|---|---|---|
| 6,021,113 A | 2/2000 | Doshi | |
| 6,845,393 B1 | 1/2005 | Murphy | |
| 8,271,813 B2 * | 9/2012 | Jackson | G05D 23/1917 713/320 |
| 8,904,240 B2 * | 12/2014 | Bradley | G06F 11/0709 714/47.1 |
| 10,620,959 B2 * | 4/2020 | Folco | G06F 9/3836 |
| 10,873,512 B2 * | 12/2020 | Gupta | G06F 11/3055 |
| 10,908,940 B1 * | 2/2021 | Farhan | H04L 41/0806 |
| 11,005,718 B2 | 5/2021 | Trim | |
| 11,429,176 B2 * | 8/2022 | Gaikwad | G06F 16/906 |

(Continued)

FOREIGN PATENT DOCUMENTS

| | | |
|---|---|---|
| CN | 106133688 A | 11/2016 |
| CN | 109960579 A | 7/2019 |

(Continued)

OTHER PUBLICATIONS

Disclosed Anonymously et al., "Method and Apparatus for Standards-Based Real-Time Management and Monitoring of Cluster-Based Machine Learning Models", An IP.com Prior Art Database Technical Disclosure, IP.com No. IPCOM000262300D, IP.com Electronic Publication Date: May 18, 2020, 4 pages.

(Continued)

*Primary Examiner* — Aurel Prifti
(74) *Attorney, Agent, or Firm* — Stephen R. Yoder

(57) ABSTRACT

Imposing and/or readjusting the CPU clocks for services of containers from various cloud-based cognitive systems in a multi-cloud cognitive computing environment for performing a particular job. The particular job having an emergency performance requirement. During processing of the job, a need to tune the execution of instructions is identified through a pre-existing emergency identification process that includes collecting clock data for each container supporting the performance of the particular job.

18 Claims, 7 Drawing Sheets

(56) References Cited

U.S. PATENT DOCUMENTS

| | | | |
|---|---|---|---|
| 2014/0095691 A1* | 4/2014 | Ganguli | H04L 41/5009 709/224 |
| 2014/0380076 A1* | 12/2014 | Weissmann | G06F 1/3293 713/323 |
| 2015/0281111 A1 | 10/2015 | Carl | |
| 2016/0006804 A1* | 1/2016 | Deshpande | H04L 41/0213 709/248 |
| 2016/0182345 A1* | 6/2016 | Herdrich | H04L 41/5009 709/224 |
| 2016/0366026 A1* | 12/2016 | Bartfai-Walcott | G06Q 10/06 |
| 2017/0147497 A1* | 5/2017 | Phelan | G06F 12/084 |
| 2017/0199564 A1* | 7/2017 | Saxena | G06F 1/3296 |
| 2017/0286153 A1 | 10/2017 | Bak | |
| 2018/0074855 A1* | 3/2018 | Kambatla | G06F 9/4881 |
| 2018/0225155 A1* | 8/2018 | Watt, Jr. | G06F 9/5083 |
| 2018/0276038 A1* | 9/2018 | Malik | G06F 9/5077 |
| 2019/0018471 A1* | 1/2019 | Chen | G06F 1/324 |
| 2019/0384348 A1* | 12/2019 | Srinivasan | G06F 1/3203 |
| 2020/0118060 A1* | 4/2020 | Mukherjee | G06Q 10/087 |
| 2020/0364086 A1* | 11/2020 | Gavali | G06F 11/3414 |
| 2021/0089361 A1* | 3/2021 | Rafey | G06F 9/45558 |
| 2021/0279157 A1* | 9/2021 | Woo | G06F 11/302 |
| 2022/0114035 A1* | 4/2022 | Vajravel | G06F 13/4282 |
| 2022/0187169 A1* | 6/2022 | King | G06F 11/3006 |
| 2022/0231916 A1* | 7/2022 | Sethi | H04L 41/0893 |
| 2022/0300343 A1* | 9/2022 | Pankanti | G06F 9/5083 |
| 2022/0308938 A1* | 9/2022 | Iyer | G06F 1/3209 |
| 2022/0326986 A1* | 10/2022 | Apfelbaum | G06F 9/5005 |
| 2022/0334862 A1* | 10/2022 | Baranwal | G06F 9/4812 |
| 2022/0350493 A1* | 11/2022 | Karumbunathan | G06F 3/067 |
| 2022/0413913 A1* | 12/2022 | Harjono | G06F 9/505 |

FOREIGN PATENT DOCUMENTS

| | | |
|---|---|---|
| EP | 3092776 A1 | 11/2016 |
| WO | 2014113367 A1 | 7/2014 |
| WO | 20180727081 W | 4/2018 |

OTHER PUBLICATIONS

Khoudali et al., "EMMCS: An edge monitoring framework for multi-cloud environments using SNMP", (IJACSA) International Journal of Advanced Computer Science and Applications, vol. 10, No. 1, 2019, 12 pages.

Liu et al., "Adaptive Distributed Service Discovery for Dependable Service Integration", 2010 13th IEEE International Symposium on Object/Component/Service-Oriented Real-Time Distributed Computing Workshops, 10 pages.

Mell et al., "The NIST Definition of Cloud Computing", National Institute of Standards and Technology, U.S. Department of Commerce, Special Publication 800-145, Sep. 2011, 7 pages.

Patel et al., "On demand clock synchronization for live VM migration in distributed cloud data centers", Journal of Parallel and Distributed Computing 138 (2020) 15-31, Elsevier, Available online Dec. 19, 2019, 17 pages.

Verma et al., "Towards A Distributed Federated Brain Architecture using Cognitive IoT Devices", Cognitive 2017 : The Ninth International Conference on Advanced Cognitive Technologies and Applications, 6 pages.

"Patent Cooperation Treaty PCT Notification of Transmittal of the International Search Report and the Written Opinion of the International Searching Authority, or the Declaration", Applicant's file reference IEE220562PCT, International application No. PCT/CN2022/105439, International filing date Jul. 13, 2022, dated Oct. 10, 2022, 9 pages.

\* cited by examiner

CENTRALIZED IMPOSING OF MULTI-CLOUD CLOCK SPEEDS

BACKGROUND

The present invention relates generally to the field of multi-cloud systems, and more particularly to distributed cognitive systems in a multi-cloud environment.

Cognitive models enabled by big data platforms are often referred to as cognitive entities. A cognitive entity is designed to remember the past, interact with humans, continuously learn, and refine response processing by looking toward the future. Cognitive capabilities enrich the automation of human needs by considering time and situation, or context. Further, cognitive entities provide dynamic responses to user queries, which lead to improved user satisfaction. Modern cognitive systems focus on particular capabilities within a pre-defined field of study. For example, some cognitive entities are developed for security processing, authentication, and authorization. While other cognitive entities are developed for vision recognition and document processing. Enhanced collaborative systems often require multiple specialized cognitive entities within a distributed cognitive system.

Distributed cognitive systems are associated with multiple model composites that are trained to perform specialized jobs. The specialized jobs may involve fields of study such as speech-to-text, voice recognition services, and/or character recognition. Accordingly, distributed cognitive systems may involve multiple cognitive services deployed on different cloud-hosting environments relying on certain backbone capabilities. Multi-cloud integration architecture incorporating services from different cloud-hosting environments connected together by a centralized cognitive interface is often provided for offering a transparent cognitive solution with underlying distributed cognitive systems.

SUMMARY

According to an aspect of the present invention, there is a method, computer program product and/or system that performs the following operations (not necessarily in the following order): (i) identifying, for a specified job to be performed within a multi-cloud distributed computing system, participating services and corresponding containers for executing instructions to complete the specified job; (ii) monitoring the corresponding containers for state change notifications (SCNs) issued by a hardware abstraction layer while performing the job; (iii) detecting a need to tune execution of the instructions for a first container among the corresponding containers based on an SCN and a required response time; and (iv) adjusting a clock speed of the first container to a selected clock speed within a permissible range for adjustment.

According to another aspect of the present invention, there is a method, computer program product and/or system that performs the operation of responsive to an emergency requirement for the specified job, requesting container information including container structure and configuration parameters. The requesting is performed via system call gates invoked by background programs within the corresponding containers including the first container.

According to yet another aspect of the present invention, there is a method, computer program product and/or system that performs the operation of pushing the container information to a central cognitive sub-system of the multi-cloud distributed computing system. The central cognitive sub-system adjusts the clock speed of the first container based on the container information.

DETAILED DESCRIPTION

Figure 1:
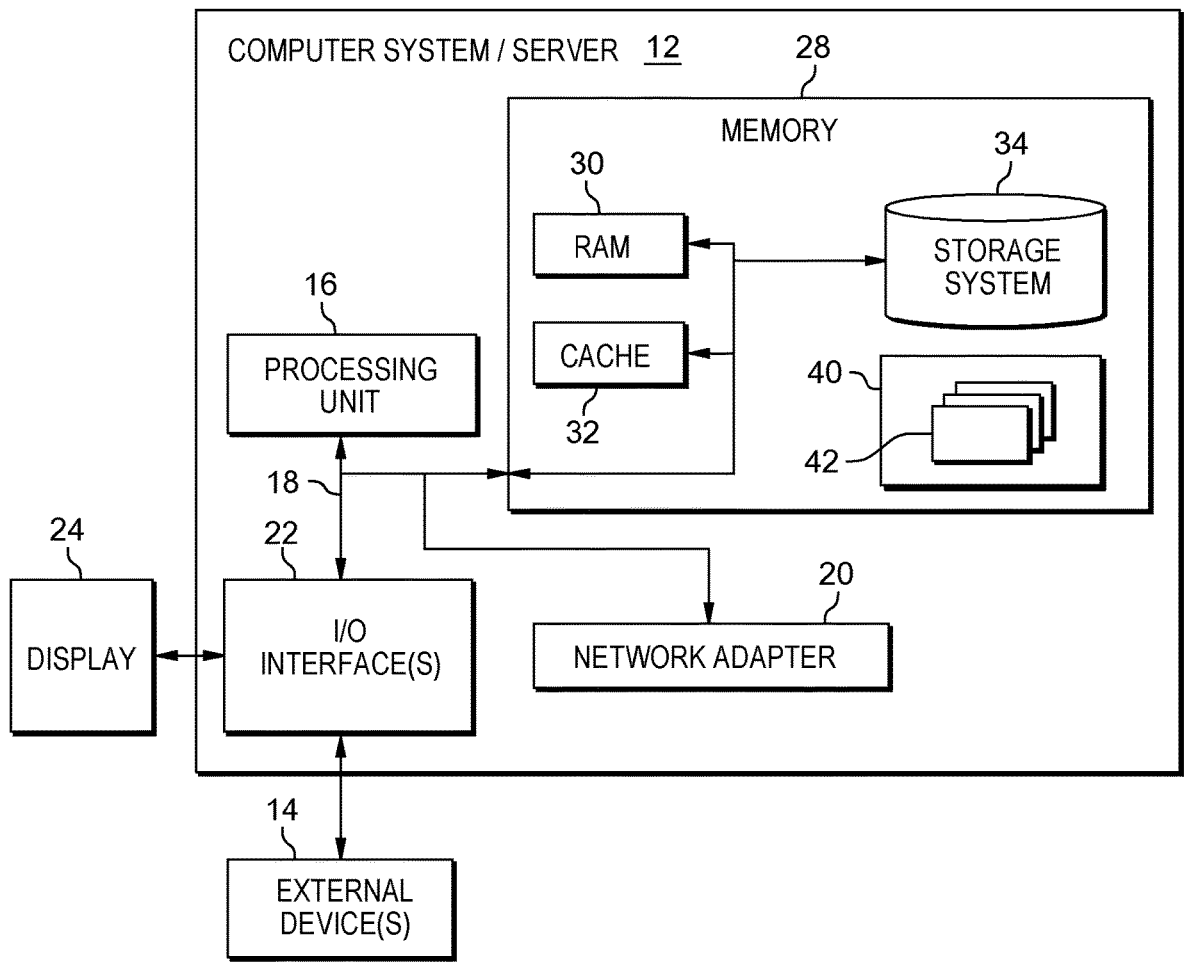
FIG. 1 depicts a cloud computing node used in a first embodiment of a system according to the present invention.

Imposing and/or readjusting the CPU clocks for services of containers from various cloud-based cognitive systems in a multi-cloud cognitive computing environment for performing a particular job. The particular job having an emergency performance requirement. During processing of the job, a need to tune the execution of instructions is identified through a pre-existing emergency identification process that includes collecting clock data for each container supporting the performance of the particular job.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
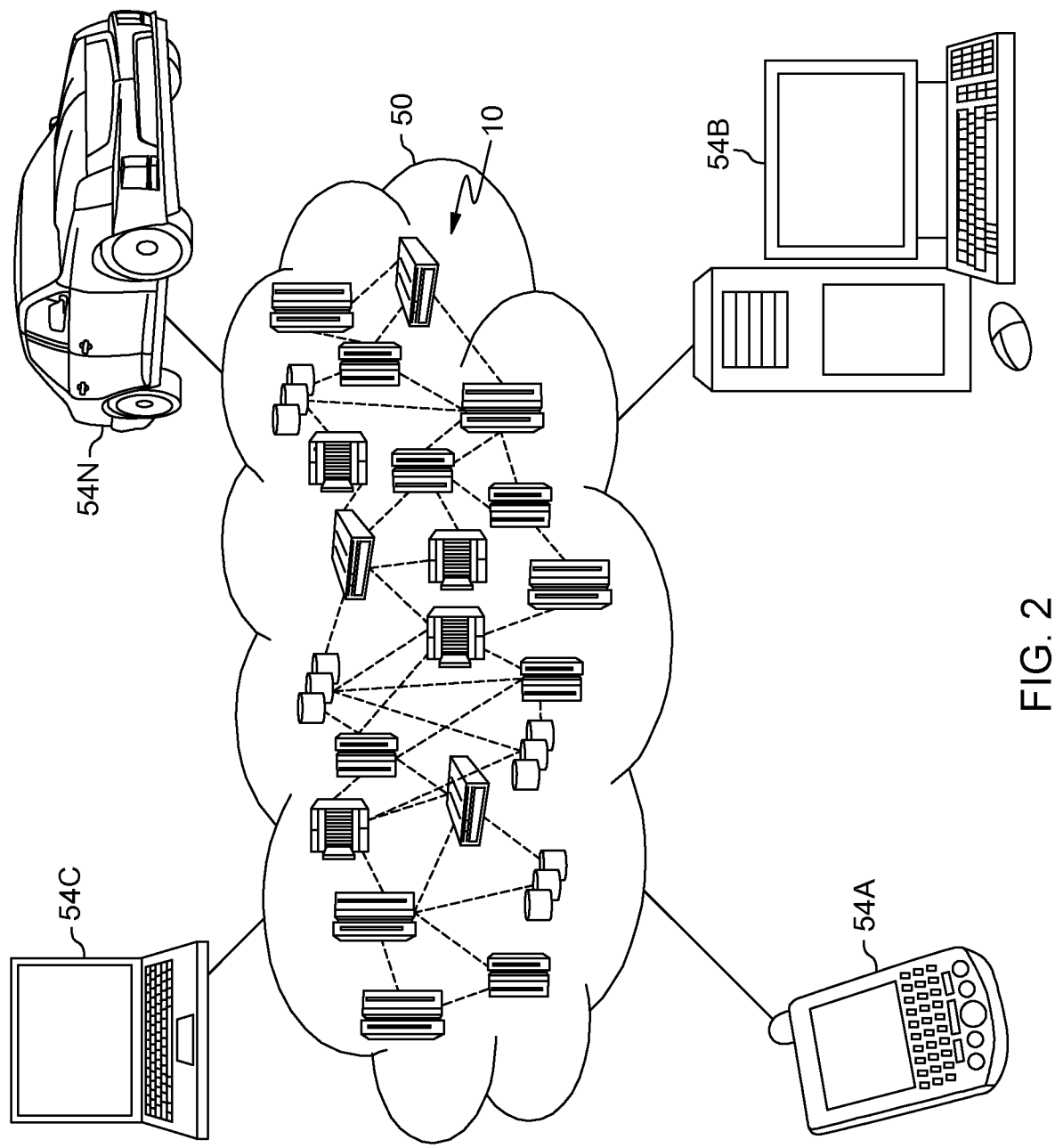
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
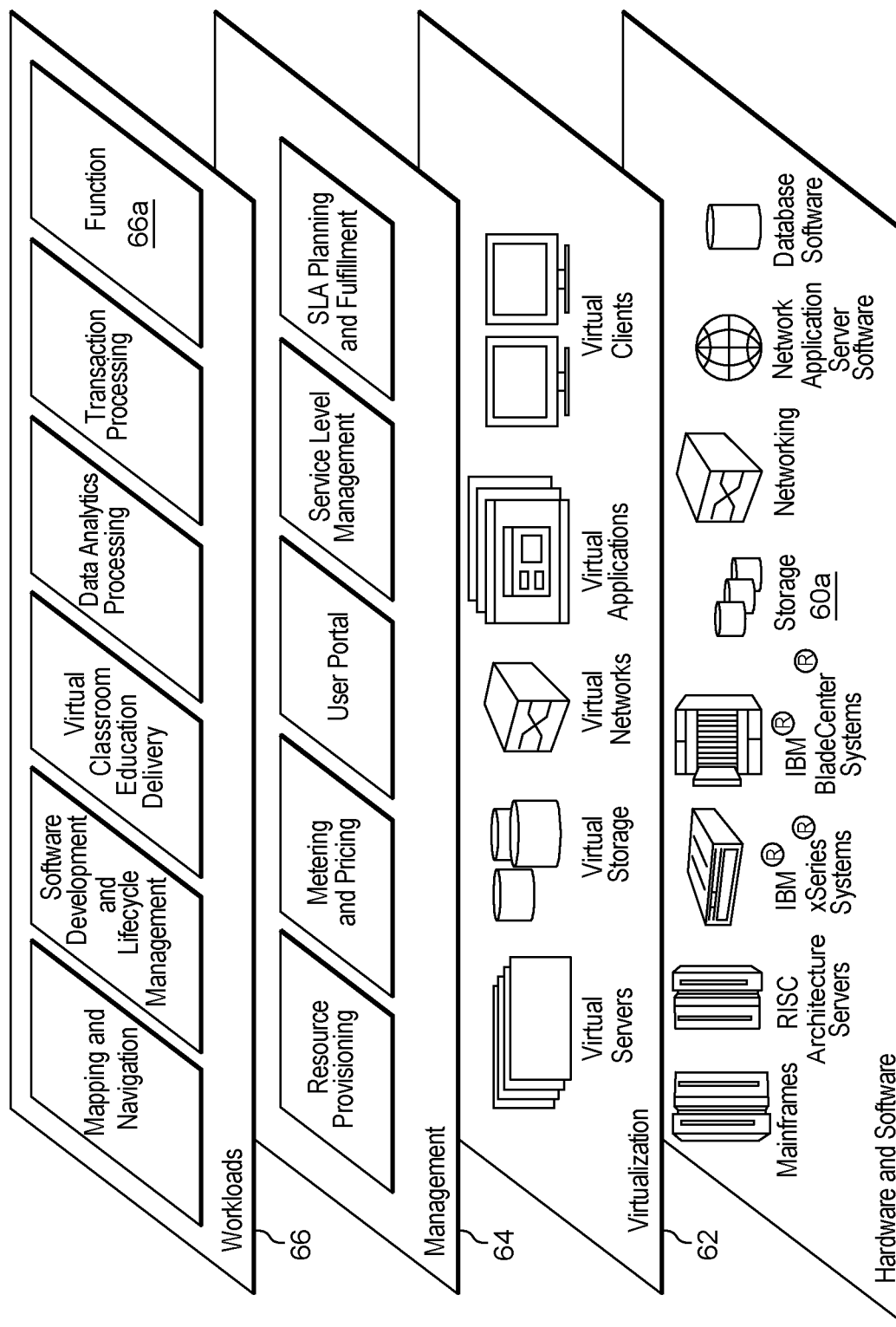
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment and Further Comments and/or Embodiments

Each of the cloud-hosting environments has its individual capabilities deployed on top of the hardware abstraction layer and provides a common orchestrated solution that can be used for various services and users to perform the activity. The business logic and the APIs can be resident on the containers/stores that are carved over the cloud environment as service instances. The service instances run on top of the hardware abstraction layer (HAL) to provide the flexibility, scalability, and high availably features using the HAL of the cloud service provider in support of managing the upper layer services in the distributed cognitive systems.

Some embodiments of the present invention are directed to an automated solution to synchronizing clock in multi-cloud. Each of the cloud-hosting environments has its individual capabilities deployed on top of the hardware abstraction layer and provides a common orchestrated solution that can be used for various services and users to perform the activity. The business logic and the APIs can be resident on the containers/stores that are carved over the cloud environment as service instances. The service instances run on top of the hardware abstraction layer (HAL) to provide the flexibility, scalability, and high availably features using the HAL of the cloud service provider in support of managing the upper layer services in the distributed cognitive systems.

Some embodiments of the present invention are directed to providing an apparatus that will work with multi-cloud distributed cognitive systems and provide the way to impose the CPU clocks of the containers in participating services based on the nature of recognized events. The method may include a centralized cognitive system controlling all the dissimilar services running in different cloud-hosted environments such that the various services are deployed on different clouds with altogether different hardware capabilities to execute the instructions.

Some embodiments of the present invention are directed to a background process instance running in conjunction with a centralized controller that collects process information for relevant container-situated services in a multi-cloud services environment.

Figure 4:
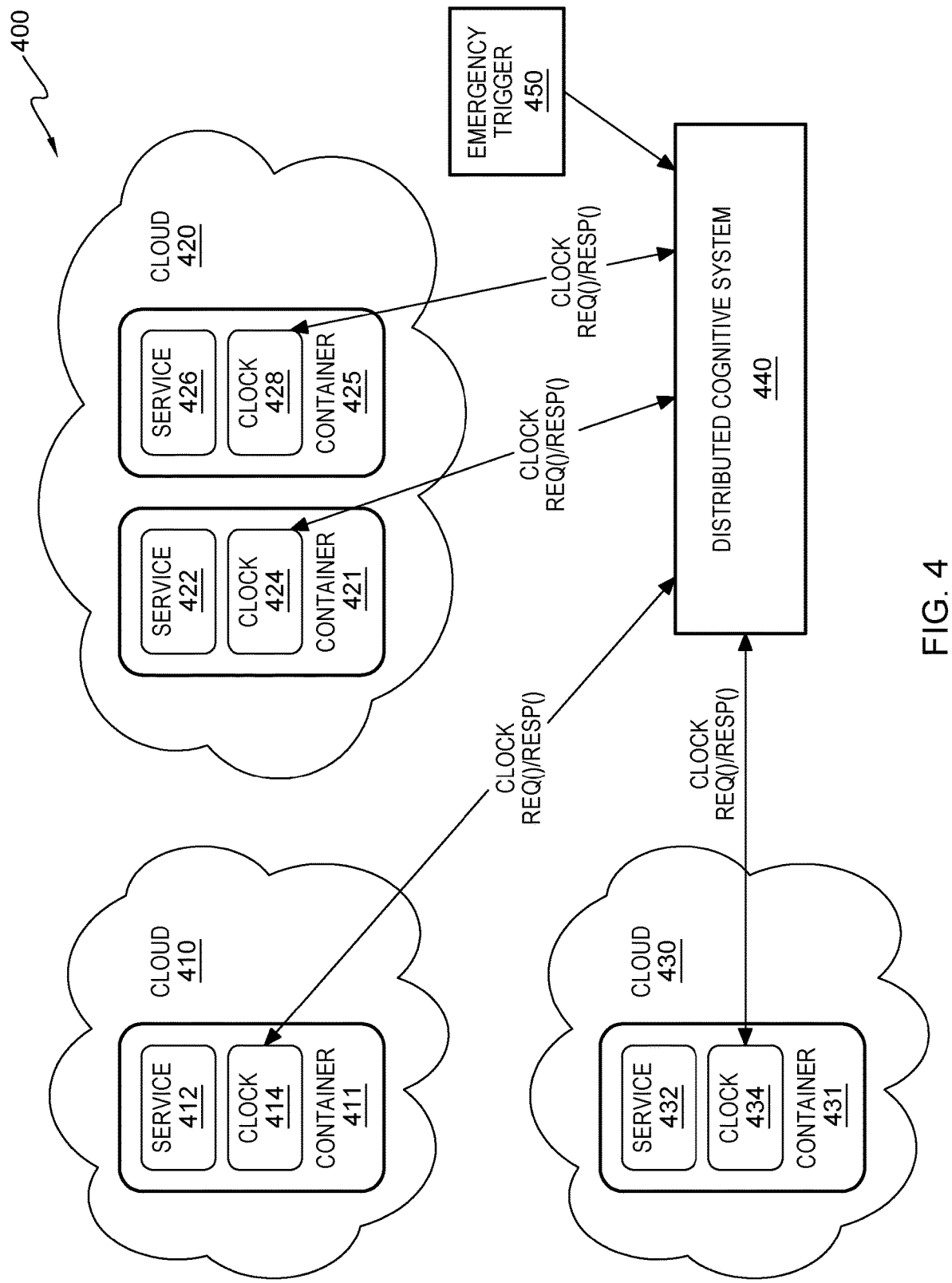
FIG. 4 is a flowchart showing a first embodiment method performed, at least in part, by the first embodiment system.

FIG. 4 shows multi-cloud distributed cognitive computing environment 400 according to the present invention. The multi-cloud distributed cognitive computing environment 400 includes: cloud subsystems 410, 420, 430; containers 411, 421, 425, 431; cloud services 412, 422, 426, 432; clock managers 414, 424, 428, 434; emergency trigger module 450; and distributed cognitive sub-system 440

Figure 6:
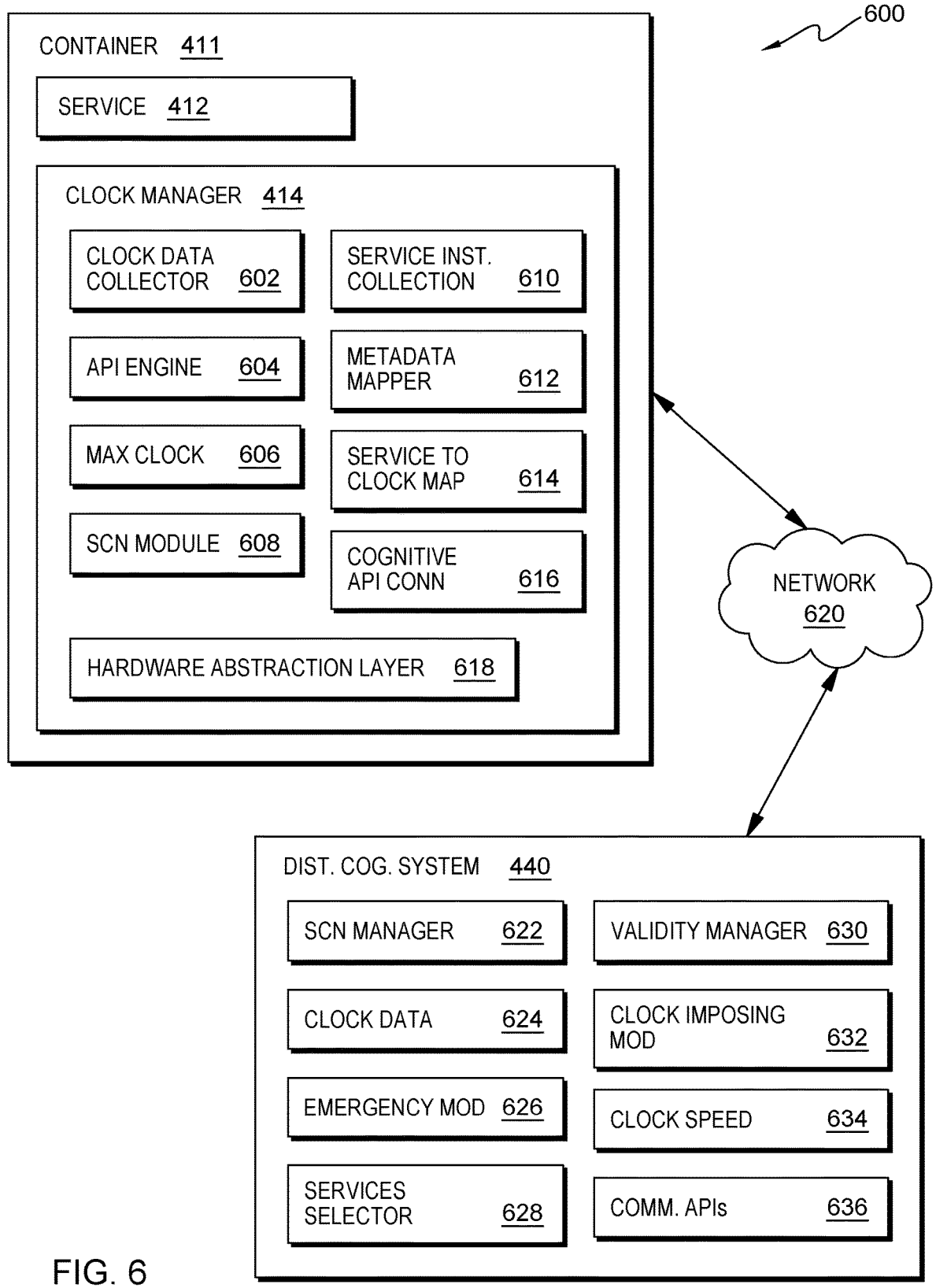
FIG. 6 is a block diagram showing a first machine logic (for example, software) portion of the first embodiment system.

FIG. 6 is a block diagram view showing detailed views of example container 411 and distributed cognitive sub-system 440 including software for performing at least some of the method operations according to the present invention. The multi-cloud distributed cognitive computing environment further includes: communications network 620; clock data collector 602; hardware interference API engine 604; maximum clock gathering module 606; SCN detector and update engine 608; service instance collection (UUID/REQ/INTERRUPTS) 610; metadata mapper 612; service-to-clock requirement map 614; cognitive API connector 616; hardware abstract layer 618; container SCN manager and metadata update engine 622; clock data collector 624; emergency requirement identifier module 626; contributor services selector 628; validity manager 630; container clock imposing logic 632; clock speed module 634; and communications APIs 636.

Figure 7:
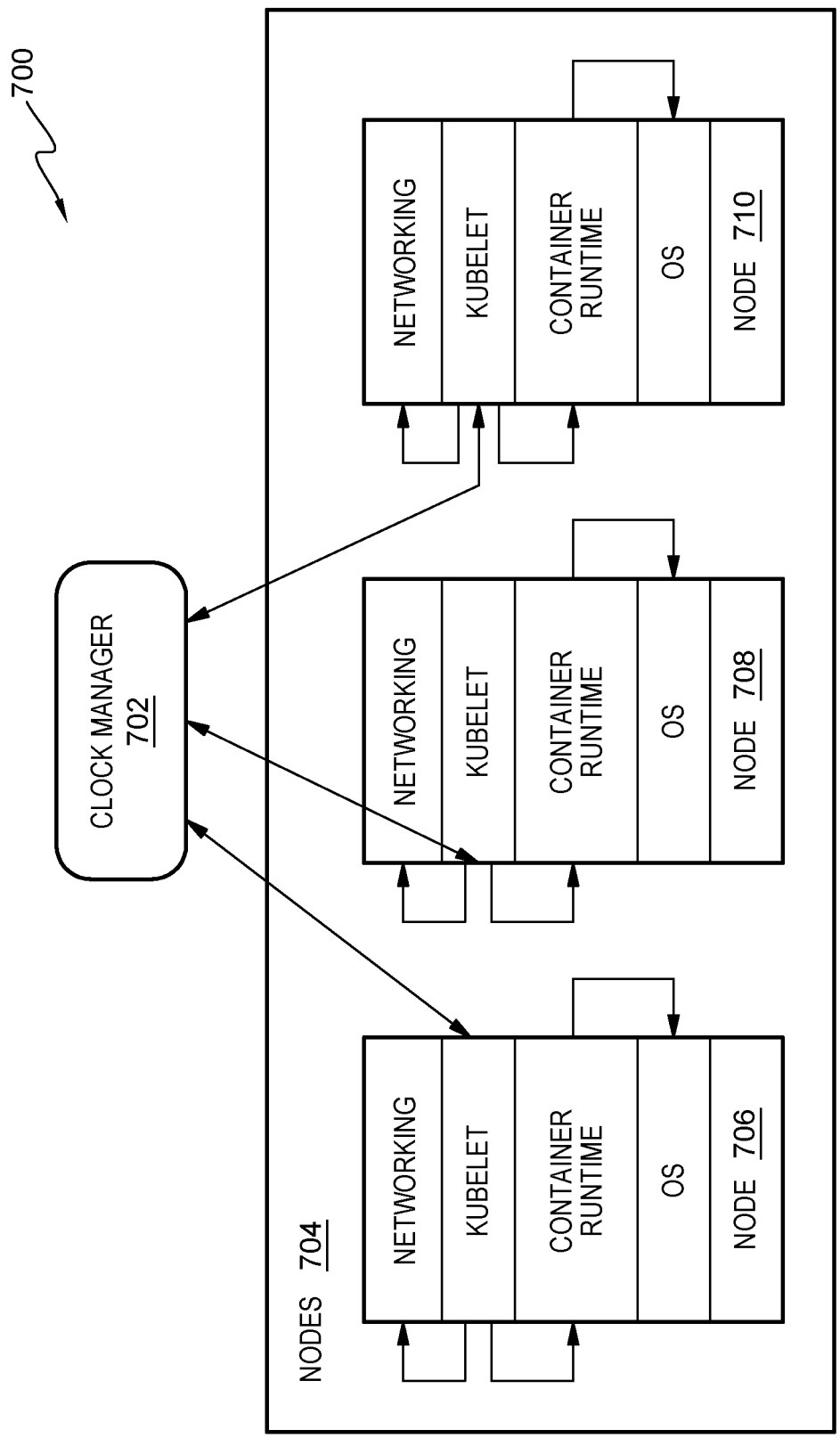
FIG. 7 is a block diagram showing a second machine logic (for example, software) portion of the first embodiment system.

FIG. 7 is a block diagram view showing communication paths within system 700 between centrally located clock manager 702 and containers shown as a set of nodes 704 from various cognitive computing systems including nodes 706, 708, and 710. According to some embodiments, system 700 is a sub-system within multi-cloud distributed cognitive computing environment 400 and the clock manger is within distributed cognitive sub-system 440.

Figure 5:
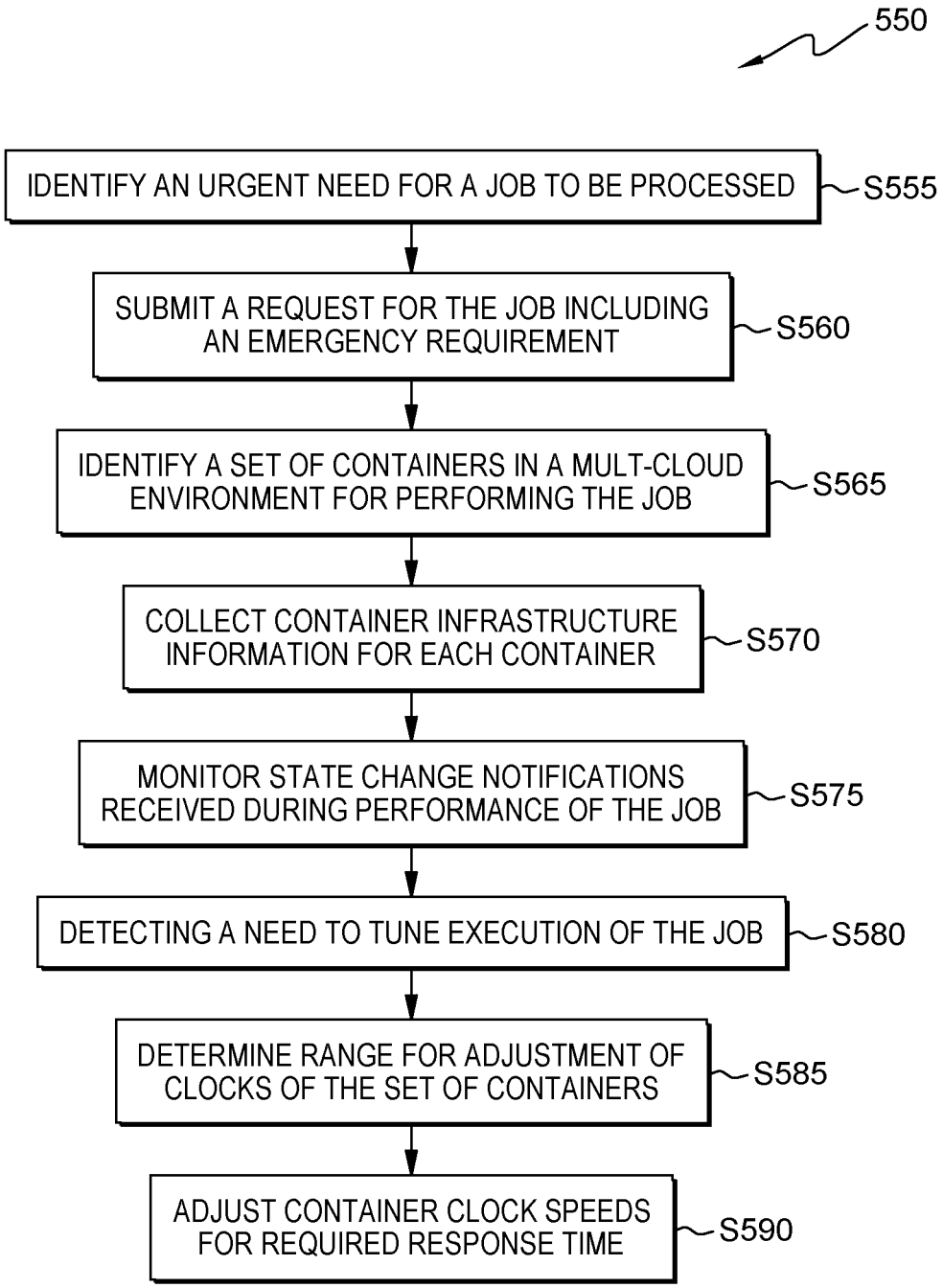
FIG. 5 is a flowchart showing a second embodiment method performed, at least in part, but the first embodiment system.

FIG. 5 shows flowchart 550 depicting a method according to the present invention. FIGS. 6 and 7 show software components of container 411 and distributed cognitive sub-system 440 communicating over network 620 in multi-cloud distributed cognitive computing environment 400. The software performs at least some of the method operations of flowchart 550. This method and associated software will now be discussed, over the course of the following paragraphs, with extensive reference to FIG. 5 (for the method operation blocks) and FIG. 6 (for the software blocks). One physical location where the software components of FIG. 6 may be stored is in storage block 60a (see FIG. 3).

Processing begins at step S555, where a program component identifies an urgent need for a job to be processed. In this example, emergency trigger module 450 indicates an urgent need for performance of a job in multi-cloud distributed cognitive computing environment 400 (FIG. 4). In the multi-cloud distributed cognitive computing environment, there are many different jobs requests submitted by the upper layer invoking various container-resident processes. For each job, multiple tasks may be served by different cloud-based cognitive services and/or sub-systems. When a particular task is flagged as an urgent or emergency task, particular attention can be given to the processing of that urgent task to see that it is completed by the required response time or within an acceptable period of time of a target response time.

According to some embodiments of the present invention, a job executing a machine learning models is considered an urgent task and is flagged for emergency handling as discussed herein. It is recognized that if machine learning models are executed with controlled and synchronized speed, model performance is improved.

Processing proceeds to step S560, where the distributed cognitive sub-system submits a request for the job including an emergency requirement. In this example, the emergency requirement includes a required response time. The job is to be performed as a set of tasks that may be divided among various cloud-based cognitive sub-systems and performed by one or more containers within each cognitive sub-system. For at least the reason that the job is urgent, the job is to be performed across the various cloud-based cognitive sub-systems.

Processing proceeds to step S565, where the distributed cognitive sub-system identifies a set of containers in a multi-cloud environment. For example, distributed cognitive sub-system 440 selects cognitive cloud sub-systems 410, 420, and 430 including containers 411, 421, 425, and 431 (FIG. 4) to perform the urgent job. In this example, the job is divisible into tasks requiring particular services provided by cloud services 412, 422, 426, and 432.

Processing proceeds to step S570, where a program component collects container infrastructure information for each container. Container infrastructure information may include, but is not limited to: (i) internal operating speed; and (ii) the current capability where the process information is based on physical characteristics and hardware allocation of an associated container; (iii) clock speed on which the container is currently operating; (iv) the base OS information; and/or (v) the CPU cores allocated to the container. In this example, a background process running in conjunction with the distributed cognitive sub-system initiates the initial process information and data structure prior to starting polling of events for the relevant containers.

Processing proceeds to step S575, where the distributed cognitive sub-system monitors state change notifications (SCNs) received by the set of containers during performance of the job. The hardware abstraction layer (HAL) issues the SCNs that are received by the various containers. The SCNs support the gathering of ongoing infrastructure information such has current clock speed and maximum permitted clock speed. According to some embodiments of the present invention the responsibility of the system call gates is to gather the process information about current clock speed, maximum clock speed, and/or permissible maximum clock speed on another hardware (in parallel) without migrating any containers. The process information is collected from call gate and is pushed to the centralized cognitive system such as distributed cognitive sub-system 440. The process information is collected periodically after the initial collection according to a pre-defined period of time or after a regular interval.

Processing proceeds to step S580, where a program component detects a need to tune execution of the urgent job. In support of the clock for the container where the service is running, the need to tune addresses the possibility of the application to update the sequencing of the events when any of the contributing services and their respective containers are not capable of operating on higher clock speed.

Processing proceeds to step S585, where a program component determines a range for adjustment of clock speeds of the set of containers. In this example, the distributed cognitive sub-system in conjunction with container-based clock managers identifies the process or processes that need to be adjusted for the clock speed and collects the permissible range for adjustment from the corresponding containers. Upon derivation of adjustment levels, the specific clock speed is selected in view of the required or approximate response time.

Processing proceeds to step S590, where a program component adjusts the container clock speeds for meeting the required response time. The set of containers are caused to operate under an imposed clock speed according to the selected clock speed. For certain services provided by a container that do not support the designated maximum speed, the service-based speed can be induced to get a maximum benefit under the circumstances. In such a case, the service level clock speed is selected, and an in-band or out-of-band message is shared to the client instance running in the same container with the new clock speed. In that way, the client instance invokes the call gate interrupts to impose the selected clock speed for the container, which internally triggers the system hardware clock to change accordingly.

Multi-cloud distributed cognitive systems may include cloud services that are coming from various different cloud-hosting environments to form a uniform cognitive interface that offers advance functions. Internally, though the service instances are provided by different cloud-hosting environments, the services are expected to behave as if provided by a single service provider when they are collected to single management controller. For example, services of a multi-cloud distributed cognitive systems may be gathered from various competing cloud service providers to create a customized distributed cognitive system. Because each cloud service provide may have well-known and/or popular features/services such as image processing, analytics, and/or augmented intelligence the apparent strengths of each cloud-hosting environment can be applied to a multi-cloud distributed cognitive system to the benefit of the end user.

According to some embodiments of the present invention, the service instances from the various cloud-hosting environments are authenticated and/or connected using a centralized platform that manages the request-response architecture. Where the service instances are deployed on different containers and/or on different cloud-hosting environments, they will be working on dissimilar CPU clock speeds. Because the clock speeds of the services are different, governing the clock speeds of these multi-cloud entities is not possible when performing a single external job. From the perspective of the user, the cognitive system is performing a single task, but it is being handled with unequal internal clocks, causing delays in the output. There is currently no way by which an external entity can impose the CPU clock in multi-cloud services to reach the homogeneous clock speeds for all the services participating. The inability to impose a CPU clock in multi-cloud services across cloud-hosting environments impacts the emergency detection capability of the cognitive system because some of the services are running on slower processing speeds even when they have infrastructure available to speed up the processing. The communication gap and the lag in the capability to discover and/or impose a CPU clock are addressed by embodiments of the present invention.

There are mechanisms available in the hardware abstraction layer for determining process information including: (i) internal operating speed; and (ii) the current capability where the process information is based on physical characteristics and hardware allocation of an associated container. These mechanisms further determine process information about maximum speed on which the container can be operated. Some embodiments of the present invention pass process information along to the centralized cognitive system for imposing the dynamic clock speed based on an emergency context propagated by the system. The services in distributed multi-cloud should operate in a certain constrained way during emergency situations for which is CPU clock tuning plays an important role.

Some embodiments of the present invention provide a method, system, and/or apparatus that will work with multi-cloud distributed cognitive system and provide the way in which the CPU clocks of the various containers in participating services can be imposed based on the nature of a recognized event. Some embodiments of the present invention are directed to a centralized cognitive system controlling all the dissimilar services running in different cloud-hosting environments. Services can be deployed on different cloud environments with altogether different hardware capabilities to execute instructions in the multi-cloud distributed cognitive system.

Some embodiments of the present invention operate in conjunction with a centralized controller to collect the process information for each container-situated service in the multi-cloud plane. The individual services will have the client instance running wherein an additional daemon will be initiated and maintained as part of the process wherein the process information about native container structure will be mined for pre-defined policing of recognized events. An inquiry is made regarding the particular configuration parameters of the native container structure including: (i) clock speed on which the container is currently operating; (ii) the base OS information; and (iii) the CPU cores allocated to the container. Further, the same information is also captured after a cycle of a pre-defined period of time, or regular interval, so the latest valid information is available.

According to some embodiments of the present invention, the recognized events may be the state change notifications (SCNs) generated by the hardware abrasion layer and received by the container systems. The hardware abstraction layer of cloud service provider initiates the SCNs when the container is generally moved between the actual execution hardware mappings. In such cases, the recognized event from the container is collected in a background process performed by a daemon program and shared with the centralized cognitive system. When a recognized event drives the background process, the controller entity sends an inquiry of the possible clock levels that can be used for the service for the current hardware. Because the clock speed and other interrelated information, process information, is unknown to the service instance, the daemon running in conjunction with the service object invokes the system call gates that requests process information including physical characteristics of the system on which the container (and the service) is running. For example, an STT system would not be aware of what speed it is translating the input text whereas the process information is very specific to the backbone infrastructure. The responsibility of the system call gates is to gather the process information about current clock speed, max clock speed, and/or permissible maximum clock speed on another hardware (in parallel) without migrating the container. This process information is collected from call gate and is pushed to the centralized cognitive system.

Upon receipt of the process information, specifically, the physical hardware clock information of the container, such as max clock speed possible, current clock, and/or permissible clock that can be availed without actual container migration in the HA systems, the processing entity is able to trigger the clock speed based on emergency identification by the distributed cognitive system upon submitting the job request. It should be noted that according to some embodiments of the present invention, process information is collected from all of the services in the plane that are contributing into the distributed multi-cloud cognitive systems.

FIG. 6 is a system diagram illustrating clock management according to some embodiments of the present invention. Clock management system 600 includes clock manager 602; nodes cluster 604; and nodes 606, 608, 610.

The background process is running as the centralized cognitive manager keeps the mappers for all the respective services and handles the interrupts which are triggered while migrating the corresponding container within the cloud orchestration boundaries. Updates to the transaction, as a whole, are performed to make the process information relevant all the time during usual operation of the system. When a pre-existing emergency identification process propagated by the distributed cognitive system identifies the need to tune the execution, a message is sent to the centralized cognitive system to impose and readjust the clock of the services participating in a particular job. Particular jobs are upper layer job submission requests invoking a container-resident process.

For example, when emergency computing is needed for services x, y and z, the controlling manager identifies the processes that need to be adjusted for the clock and collects the permissible range for the clock adjustments. Based on the derived adjustment levels, the specific clock speed is selected considering the approximate response time. Where certain services are not supporting the designated max speed, the service-based speed can be induced to get maximum benefit from the situation. In such a case, the service level clock speed is selected, and an in-band or out-of-band message is shared to the client instance running in the same container with the new clock speed. The client instance invokes the call gate interrupts to impose the clock speed for the container to internally trigger the system hardware clock change.

Accordingly, the clock speed is imposed by centralized entities for the multi-cloud distributed cognitive system so the centralized controller can set the sense of urgency for some requests that need superspeed resolution. The clock speeds of the containers where the services are running is controlled by an external entity (via an authenticated means) and allows the system to work faster in case of emergency computation in support of meeting the user requirements during an urgent task. Further, this trigger is temporary and only imposed at the time of emergency situations so as to not impact usual activities on the container or any other tenants while helping to give a better user response for a multi-cloud cognitive system.

Some embodiments of the present invention are directed to a centralized cognitive system controlling dissimilar services running in different cloud-hosting environments. The dissimilar services in the cognitive systems are deployed on different cloud environments with different hardware capabilities to execute instructions from a centralized controller. A background process running in conjunction with the centralized controller initiates the initial process information and data structure prior to starting polling of events for the containers. The background process, run by a daemon, collects process information from all the container services in multi-cloud plane. The individual services have a client instance running (as a container Lib) as an additional daemon. The daemon is maintained as a lib service in the container class with the hardware interface provision to the lib function. The container lib process gathers the data about native container structure and mine the container for pre-defined policing of the events. The ACTIVATION_EVENT LIST includes the SCNs generated by the hardware abstraction layer and received by the container systems. The hardware abstraction layer initiates the SCNs for containers when MOVE or MIGRATE actions are triggered. The SCNs are received from the container management plane for container hardware mapping. The events from the containers are articulated for further processing.

According to some embodiments of the present invention, when centralized cognitive system is notified of the events, the centralized controller sends an inquiry of the possible clock levels that can be used for the service for the current hardware. The clock speed and other interrelated information is unknown to the service instance because the information is very specific to the backbone infrastructure. For example, an STT system would not have the data regarding what speed it is translating input text. The daemon running in conjunction with the service object is used to invoke the system call gates. The call gates inquire physical characteristics of the system on which the container (and the service) is running. Additionally, the call gates gather the process information including current clock speed, max clock speed, and/or permissible maximum clock speed on another hardware (in parallel) without migrating the container. The information is collected from the call gate and is pushed to the centralized cognitive system.

Some embodiments of the present invention are directed to monitoring the services contributing into the distributed multi-cloud cognitive systems for process information for the jobs requested of container-resident processes from upper layer job submission requests. When process information is determined for a container including physical hardware clock information such as max clock speed possible, current clock, and/or permissible clock that can be availed without actual container migration in the HA systems, the process information is used by the centralized processing entity to trigger the clock speed based on the emergency identification of the distributed cognitive system. The process running in centralized cognitive manager keeps the mappers for all the respective services and handles the interrupts which are triggered while migrating the container within the cloud orchestration boundaries. When the pre-existing emergency identification process identifies the need to tune the execution, a message is sent to the centralized cognitive system to impose and readjust the clock of the services participating for the particular job. Upon derivation of adjustment levels, the specific clock speed is selected considering the approximate response time. In case certain services are not supporting the designated max speed, the service-based speed can be induced to get maximum benefit from the situation. Accordingly, the service level clock speed may be selected, and an in-band or out-of-band message is shared to the client instance running in the same container with new clock speed. The client instance invokes the call gate interrupts to impose the clock speed for the container, which internally triggers the system hardware clock change.

Embodiments of the present invention are directed to more than on-demand clock synchronization for live VM migration in distributed cloud data centers and creation of a distributed Cognitive Computer Systems (CCS) that can perform analytics on demand across heterogeneous networks of interconnected devices.

Some embodiments of the present invention are directed to determining a method for providing an apparatus that will work with multi-cloud distributed cognitive system and providing the way by which the CPU clocks of the containers in participating services can be imposed based on the nature of the event recognized.

Some embodiments of the present invention are directed to a centralized cognitive system controlling all the dissimilar services running in different clouds and these services are deployed on different clouds with altogether different hardware capabilities to execute the instructions.

Some embodiments of the present invention are directed to a process instance running in conjunction with the centralized controller that collects process information for all the container-situated services in a multi-cloud plane.

Some embodiments of the present invention are directed to a centralized imposing of a multi-cloud clock.

Some embodiments of the present invention are directed to providing the way by which the CPU clocks of the containers in participating services can be imposed based on the nature of the event recognized.

Some embodiments of the present invention are directed to a centralized cognitive system controlling all the dissimilar services running in different clouds and these services are deployed on different clouds with altogether different hardware capabilities to execute the instructions.

Some embodiments of the present invention are directed to providing a way that can govern the clock speed of multi-cloud entities participating in performance of a single external job. Some embodiments of the present invention provide a way by which an external entity can impose the CPU clock in multi-cloud service to gain the homogeneous clock speeds for all the participating services.

Some embodiments of the present invention are directed to providing a means by which process information can be passed to the centralized cognitive system and imposing of the dynamic clock speed based on the emergency context propagated by the distributed cognitive system while submitting the job request.

Some embodiments of the present invention are directed to providing a better way for real time of emergency processing in cloud services processing which is much needed in case of multi-user planes such as 5G and cloud user space.

Some embodiments of the present invention are directed to improving time-oriented results by controlling the operating speed of certain tasks that help gain overall user experience.

Some embodiments of the present invention are directed to a mechanism by which the time critical machine learning models (MLMs) can be executed for their attributes with better clock speed of the underlying container and hardware logic to gain optimized response time for all the services contributing in a distributed cognitive system.

Some embodiments of the present invention are directed to enabling different asymmetric clocking hardware to work together by imposing a centralized clock speed which enables the overall hybrid cloud system to get more virtual machines as part of the cloud and seamlessly operate containerized environment even though the hardware may be incompatible.

Some embodiments of the present invention may include one, or more, of the following features, characteristics and/or advantages: (i) provides a better way for real time of emergency processing in cloud services, the processing which is much needed in the case of multi-user planes like 5G and cloud user space; (ii) provides a way to get better time-oriented results by controlling the operating speed of certain tasks that help gaining overall user experience; (iii) provides a mechanism by which the time critical MLMs can be executed for their attributes with better clock speed of the underlying container and hardware logic to gain optimized response time for all the services contributing in distributed system; (iv) provides a way to communicate with multi-cloud infrastructure from externally authenticated entity for getting things done per the cognitive system; and/or (v) offers flexibility and adds the potential while using multiple cloud services to build the centralized solution.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying, for a specified job to be performed within a multi-cloud distributed computing system, participating cognitive services of a plurality of cloud-hosting environments;
   identifying, by a centralized cognitive system, containers of the participating cognitive services in the plurality of cloud-hosting environments, the containers identified for collectively executing a set of instructions to complete the specified job;
   monitoring, by the centralized cognitive system, the identified containers in the plurality of cloud-hosting environments for state change notifications (SCNs) issued by hardware abstraction layers of corresponding cloud-hosting environments while executing the set of instructions to complete the specified job;
   detecting a need to tune execution of a subset of instructions for a first container among the identified containers based on an SCN and a required response time; and
   adjusting a clock speed of the first container to a selected clock speed within a permissible range for adjustment, the plurality of cloud-hosting environments having independent clock speeds.

2. The computer-implemented method of claim 1, further comprising:
   responsive to an emergency requirement for the specified job, requesting container information including container structure and configuration parameters;
   wherein:
   the requesting is performed via system call gates invoked by background programs within the corresponding containers including the first container.

3. The computer-implemented method of claim 2, wherein:
   the container information includes current clock speed, maximum clock speed, permissible maximum clock speed on another hardware, base operating system information, and a count of how many CPU cores are allocated to the first container; and
   detecting the need to tune execution is further based on the container information.

4. The computer-implemented method of claim 2, further comprising:
   pushing the container information to a central cognitive sub-system of the multi-cloud distributed computing system;
   wherein:
   the central cognitive sub-system adjusts the clock speed of the first container based on the container information.

5. The computer-implemented method of claim 1, wherein:
   monitoring the identified containers includes periodically collecting current container information, and
   detecting a need to tune execution of the subset of instructions is further based on the current container information.

6. The computer-implemented method of claim 1; further comprising:
   determining available clock speeds for the participating cognitive services according to current hardware to establish the permissible range of adjustment of the clock speed.

7. A computer program product comprising a computer-readable storage medium having a set of instructions stored therein which, when executed by a processor, causes the processor to perform a method comprising:
   identifying, for a specified job to be performed within a multi-cloud distributed computing system, participating cognitive services of a plurality of cloud-hosting environments;
   identifying, by a centralized cognitive system, containers of the participating cognitive services in the plurality of cloud-hosting environments, the containers identified for collectively executing a set of instructions to complete the specified job;
   monitoring, by the centralized cognitive system, the identified containers in the plurality of cloud-hosting environments for state change notifications (SCNs) issued by hardware abstraction layers of corresponding cloud-hosting environments while executing the set of instructions to complete the specified job;
   detecting a need to tune execution of a subset of instructions for a first container among the identified containers based on an SCN and a required response time; and
   adjusting a clock speed of the first container to a selected clock speed within a permissible range for adjustment, the plurality of cloud-hosting environments having independent clock speeds.

8. The computer program product of claim 7, further causing the processor to perform a method including:
   responsive to an emergency requirement for the specified job, requesting container information including container structure and configuration parameters;
   wherein:
   the requesting is performed via system call gates invoked by background programs within the corresponding containers including the first container.

9. The computer program product of claim 8, wherein:
   the container information includes current clock speed, maximum clock speed, permissible maximum clock speed on another hardware, base operating system information, and a count of how many CPU cores are allocated to the first container; and
   detecting the need to tune execution is further based on the container information.

10. The computer program product of claim 8, further causing the processor to perform a method including:
    pushing the container information to a central cognitive sub-system of the multi-cloud distributed computing system;
    wherein:

the central cognitive sub-system adjusts the clock speed of the first container based on the container information.

11. The computer program product of claim 7, wherein:
monitoring the identified containers includes periodically collecting current container information, and
detecting a need to tune execution of the subset of instructions is further based on the current container information.

12. The computer program product of claim 7, further causing the processor to perform a method including:
determining available clock speeds for the participating cognitive services according to current hardware to establish the permissible range of adjustment of the clock speed.

13. A computer system comprising:
a processor set; and
a computer readable storage medium;
wherein:
the processor set is structured, located, connected, or programmed to run program instructions stored on the computer readable storage medium; and
the program instructions which, when executed by the processor set, cause the processor set to perform a method comprising:
identifying, for a specified job to be performed within a multi-cloud distributed computing system, participating cognitive services of a plurality of cloud-hosting environments;
identifying, by a centralized cognitive system, containers of the participating cognitive services in the plurality of cloud-hosting environments, the containers identified for collectively executing a set of instructions to complete the specified job;
monitoring, by the centralized cognitive system, the identified containers in the plurality of cloud-hosting environments for state change notifications (SCNs) issued by hardware abstraction layers of corresponding cloud-hosting environments while executing the set of instructions to complete the specified job;
detecting a need to tune execution of a subset of instructions for a first container among the identified containers based on an SCN and a required response time; and
adjusting a clock speed of the first container to a selected clock speed within a permissible range for adjustment, the plurality of cloud-hosting environments having independent clock speeds.

14. The computer system of claim 13, further causing the processor set to perform a method including:
responsive to an emergency requirement for the specified job, requesting container information including container structure and configuration parameters;
wherein:
the requesting is performed via system call gates invoked by background programs within the corresponding containers including the first container.

15. The computer system of claim 14, wherein:
the container information includes current clock speed, maximum clock speed, permissible maximum clock speed on another hardware, base operating system information, and a count of how many CPU cores are allocated to the first container; and
detecting the need to tune execution is further based on the container information.

16. The computer system of claim 14, further causing the processor set to perform a method including:
pushing the container information to a central cognitive sub-system of the multi-cloud wherein:
distributed computing system;
the central cognitive sub-system adjusts the clock speed of the first container based on the container information.

17. The computer system of claim 13, wherein:
monitoring the identified containers includes periodically collecting current container information, and
detecting a need to tune execution of the subset of instructions is further based on the current container information.

18. The computer system of claim 13, further causing the processor to perform a method including:
determining available clock speeds for the participating cognitive services according to current hardware to establish the permissible range of adjustment of the clock speed.

* * * * *